United States Patent
Perisse et al.

(10) Patent No.: US 12,305,066 B2
(45) Date of Patent: *May 20, 2025

(54) COATING COMPOSITION FOR BEVERAGE CONTAINERS

(71) Applicant: SWIMC LLC, Cleveland, OH (US)

(72) Inventors: Denis Perisse, Macon (FR); Sophie Bouvy, Macon (FR); Thierry Meunier, St Martin de Belle Roche (FR)

(73) Assignee: SWIMC LLC, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/490,826

(22) Filed: Oct. 20, 2023

(65) Prior Publication Data

US 2024/0132744 A1 Apr. 25, 2024
US 2024/0228820 A9 Jul. 11, 2024

Related U.S. Application Data

(63) Continuation of application No. 18/063,393, filed on Dec. 8, 2022, now Pat. No. 11,840,637, which is a continuation of application No. PCT/US2021/036796, filed on Jun. 10, 2021.

(60) Provisional application No. 63/038,302, filed on Jun. 12, 2020.

(51) Int. Cl.

| C09D 151/06 | (2006.01) |
|---|---|
| B05D 7/22 | (2006.01) |
| B65D 1/16 | (2006.01) |
| C08K 5/20 | (2006.01) |
| C09D 7/20 | (2018.01) |
| C09D 7/63 | (2018.01) |
| C09D 7/65 | (2018.01) |
| C09D 123/08 | (2006.01) |

(52) U.S. Cl.
CPC ........... *C09D 151/06* (2013.01); *B05D 7/227* (2013.01); *B65D 1/165* (2013.01); *C08K 5/20* (2013.01); *C09D 7/20* (2018.01); *C09D 7/63* (2018.01); *C09D 7/65* (2018.01); *C09D 123/0823* (2013.01); *C09D 123/0869* (2013.01)

(58) Field of Classification Search
CPC .......... C09D 151/06; C09D 7/20; C09D 7/63; C09D 7/65; C09D 123/08; B05D 7/22; B05D 1/16; C08K 5/20
USPC ..................................... 220/62.12
See application file for complete search history.

(56) References Cited

U.S. PATENT DOCUMENTS

| 8,168,276 | B2 | 5/2012 | Cleaver et al. |
|---|---|---|---|
| 8,927,075 | B2 | 1/2015 | Gibanel et al. |
| 9,981,776 | B2 | 5/2018 | Gibanel et al. |
| 10,273,380 | B2 | 4/2019 | Parekh et al. |
| 2013/0316109 | A1 | 11/2013 | Niederst et al. |
| 2014/0045986 | A1 | 2/2014 | Adkinson et al. |
| 2015/0275019 | A1 | 10/2015 | De Zeeuw et al. |
| 2015/0344718 | A1 | 12/2015 | Lundgard et al. |
| 2016/0038973 | A1 | 2/2016 | De Zeeuw et al. |
| 2018/0265729 | A1 | 9/2018 | Gibanel et al. |
| 2018/0346196 | A1 | 12/2018 | Gibanel et al. |
| 2019/0210962 | A1 | 7/2019 | Zhou et al. |
| 2020/0148908 | A1 | 5/2020 | Desousa et al. |
| 2022/0025208 | A1* | 1/2022 | Kashiwakura ........ C08G 63/688 |

FOREIGN PATENT DOCUMENTS

| CN | 104870579 A | 8/2015 | |
|---|---|---|---|
| CN | 110922815 A | 3/2020 | |
| JP | 2001341749 A | 12/2001 | |
| WO | 2008036629 A2 | 3/2008 | |
| WO | 2012130563 A1 | 10/2012 | |
| WO | 2017194464 A1 | 11/2017 | |
| WO | 2018085052 A1 | 5/2018 | |
| WO | WO-2019046737 A1 * | 3/2019 | ......... B65D 17/4012 |
| WO | WO-2020100776 A1 * | 5/2020 | ............ B21D 51/26 |
| WO | 2020145171 A1 | 7/2020 | |

OTHER PUBLICATIONS

International Search Report and Written Opinion issued in Application No. PCT/US2021/036796 dated Sep. 14, 2021, 8 pages.
Canvera™ 1340 Polyolefin Dispersion; Technical Data Sheet; ®TM Trademark of The Dow Chemical Company ("Dow") or an affiliated company of Dow 884-00675-0215-NAR-EN-BDC Rev1 CANVERA™ 1310 Polyolefin Dispersion / Dow Coating Materials , 3 pages.
Canvera™ 1350 Polyolefin Dispersion; Technical Data Sheet; ®TM Trademark of The Dow Chemical Company ("Dow") or an affiliated company of Dow 884-00878-0116-NAR-EN-CDP Rev1 CANVERA™ 1350 Polyolefin Dispersion / Dow Coating Materials , 4 pages.
"DuPont™ Tyzor® Organic Titanates", General Brochure, The DuPont Oval Logo, DuPont™, and The miracles of science™ are trademarks or registered trademarks of E.I. du Pont de Nemours and Company. TYZOR® is a registered trademark of E.I. du Pont de Nemours and Company. Copyright @ 2001 E.I. du Pont de Nemours and Company. All rights reserved; http://www.dupont.com/tyzor; 11 pages.
"Primid® QM-1260" Crosslinker for exterior durable powder coatings; EMS-CHEMIE AG, CH-7013 Domat/Ems; www.emsgriltech.com; 2 pages.
Extended European Search Report for European Patent Application EP 21822252.9, dated Jul. 1, 2024.

* cited by examiner

*Primary Examiner* — Deve V Hall
(74) *Attorney, Agent, or Firm* — Honigman LLP (57) ABSTRACT

Beverage containers and methods of coating are provided. The beverage containers include a metal substrate that is at least partially coated with a coating prepared from a composition that includes a binder system, a cross linker, and a catalyst.

20 Claims, 2 Drawing Sheets

COATING COMPOSITION FOR BEVERAGE CONTAINERS

CROSS REFERENCE TO RELATED APPLICATIONS

The present application is a continuation of U.S. application Ser. No. 18/063,393 filed on Dec. 8, 2022, which is a continuation under 35 U.S.C. 120 of International Application No. PCT/US2021/036796, entitled COATING COMPOSITION FOR BEVERAGE CONTAINERS, filed on Jun. 10, 2021, which claims benefit under 35 U.S.C. § 119 (e) from U.S. Provisional Patent Application Ser. No. 63/038,302, entitled "COATING COMPOSITION FOR BEVERAGE CONTAINERS", filed Jun. 12, 2020, which are hereby incorporated by reference in their entirety.

FIELD

The present disclosure relates to coating compositions for beverage containers, and aqueous coating compositions for interior surfaces of beverage containers.

BACKGROUND

A wide variety of compositions have been used to coat the surfaces of packaging articles, such as beverage containers. For example, metal cans are sometimes coated using coil coating or sheet coating operations where a planar coil or sheet of a suitable substrate, such as steel or aluminum metal, is coated with a suitable composition and hardened by curing in an oven. The coated substrate may then be formed into a can end or body. Alternatively, liquid coating compositions may be applied by spraying, dipping, rolling, or other suitable application methods to the formed article and then cured.

Packaging coatings should preferably be capable of high-speed application to the substrate and provide the necessary properties when hardened to perform in this demanding end use. For example, the composition and coating should be safe for food contact, have good adhesion to the substrate, and resist degradation over long periods of time, even when exposed to harsh environments. Many current packaging coatings suffer from one or more performance defects and/or contain extractable quantities of one or more undesirable compounds particularly when the coatings are exposed to short cure cycles.

Beverage container ends, such as easy open container ends, are often the most challenging coating application in the beverage container coating industry. In some instances, this challenge is due the severe level of fabrication a coating and substrate must endure in formation of the beverage container end. For instance, beverage container ends are formed by first applying the coating composition to a flat metal coil (typically aluminum or steel coil). The beverage container end is then stamped from the coated metal coil. If an easy open container is desired, a rivet to which a pull tab is attached is also formed from the substrate and such rivet has a very severe contour. Many packaging coatings (including many coatings suitable for use on the sidewalls of beverage containers) do not possess the toughness and flexibility to accommodate the stamping process used to form the can end and/or the rivet, while still exhibiting sufficient corrosion resistance for the end use at the same time. With prior coatings, there was typically a tradeoff between the flexibility and the corrosion resistance of a coating. That is, one type of coating composition may have been sufficiently flexible to accommodate the stamping and rivet formation, but such performance came at the expense of corrosion resistance. Both performance characteristics are often desired in many food and beverage container coatings.

Prior coatings to achieve the high level of performance required for beverage container ends were often BPA and/or epoxy-based compositions combined with melamine or phenolic cross linkers. The melamine and phenolic resins were based on formaldehyde monomers. Such components are becoming less desired in the packaging field for a variety of reasons. However, non-epoxy and non-formaldehyde alternatives tend to have shortcomings in terms of processing and/or performance when used in the context of coating operations for beverage container ends. Polyolefin dispersions are one alternative to epoxy coatings. Polyolefin dispersions have been used as spray coatings for the interior body of food or beverage containers; however, but when prior polyolefin-based compositions are used in the harsh and challenging fabrication of beverage can ends subjected to short cure times, the curing process and prior polyolefin chemistry tends to fall short of performance expectations.

SUMMARY

The present disclosure provides an aqueous coating composition suitable for a beverage container that includes a metal substrate that is at least partially coated with the aqueous coating composition. In one aspect or embodiment, the aqueous coating composition includes a carrier fluid, a polyolefin binder system, a cross linker; and a transition metal catalyst, which preferably is water dispersible. In some embodiments, the aqueous coating composition is suitable for forming a beverage contact coating of an easy open end of a beverage container. In other embodiments or aspects, the coating composition is an interior beverage can end coating composition.

In other embodiments or aspects, the aqueous coating composition of the previous paragraph and following paragraphs of this Summary may include one or more optional features or components. These optional features or components may include any combination of the following aspects and/or embodiments: wherein the polyolefin binder system includes a polyolefin copolymer with structural units derived from reactants including two or more C2 to C10 alpha-olefins; and/or wherein the alpha-olefins are selected from C2 to C6 alpha-olefins; and/or wherein the alpha-olefins are selected from C2 to C4 alpha-olefins; and/or wherein the polyolefin binder system includes a polyolefin copolymer with structural units derived from reactants including ethylene and one or more $C_3$ to $C_{10}$ alpha-olefins; and/or wherein the polyolefin binder system includes a polyolefin copolymer with structural units derived from reactants including ethylene and propylene; and/or wherein the polyolefin binder system includes an acid-functionalized polyolefin; and/or wherein the acid functionalized polyolefin is a copolymer with structural units derived from reactants including one or more C2 to C10 alpha-olefins and (meth) acrylic acid; and/or wherein the coating composition includes an emulsion polymerizable ethylenically unsaturated monomer component that is optionally emulsion polymerized in the presence of the polyolefin binder system;

and/or wherein the coating composition includes about 30% to about 35% weight percent of total resin solids; and/or wherein the coating composition includes at least about 50% weight percent of one or more polyolefin polymers, based on the total resin solids of the coating composition.

In yet other aspects or embodiments, the aqueous coating composition of the previous and following paragraphs of this Summary may include further optional features or components. These further optional features or components may include any combination of the following aspects and/or embodiments: wherein the cross linker is a nitrogen-containing carboxyl-reactive cross linker; and/or wherein the nitrogen-containing carboxyl-reactive cross linker includes hydroxyl groups; and/or wherein the nitrogen-containing carboxyl-reactive cross linker includes at least one amide group, at least one imide group, or combinations thereof; and/or wherein the nitrogen-containing carboxyl-reactive cross linker includes a beta-hydroxyl group relative to a nitrogen atom of an amide bond; and/or wherein the nitrogen-containing carboxyl-reactive cross linker has the structure HO—$R_1$—N($R_2$)—CO—X—CO—N($R_2$)—($R_1$)—OH wherein $R_1$ and $R_2$ are independently organic groups, X is a bivalent organic group, and wherein the hydroxyl groups are independently primary or secondary hydroxyl groups; and/or wherein the nitrogen-containing carboxyl-reactive cross linker comprises a compound of the following formula:

and/or wherein the nitrogen-containing carboxyl-reactive cross linker includes a carbodiimide structural moiety.

In further aspects or embodiments, the aqueous coating composition of the previous or following paragraphs of this Summary may include further optional features or components. These further optional features or components may include any combination of the following aspects and/or embodiments: wherein the transition metal catalyst includes at least one metal selected from aluminum (Al), cobalt (Co), iron (Fe), titanium (Ti), zinc (Zn), zirconium (Zr), or mixtures thereof; and/or wherein the transition metal catalyst comprises an organometallic transition metal catalyst and/or wherein the organometallic transition metal catalyst includes one or more alkoxy ligands and/or wherein the organometallic transition metal catalyst includes one or more alkoxycarbonyl ligands and/or wherein the alkoxy or the alkoxycarbonyl ligands include a C1 to C6 alkyl group and/or wherein the organometallic transition metal catalyst is an organometallic transition metal chelate and/or wherein the transition metal catalyst is selected from titanium acetylacetonate, tetraalkyltitanates, isopropylorthotitanate, water-soluble titanium chelated salts, triethanolamine chelates of titanium, tetratriethanolamine chelates of titanium, lactic acid titanate chelate salts, or a combination thereof and/or wherein the coating composition includes at least about 400 ppm of the transition metal catalyst based on the total amount of transition metal in the catalyst relative to the total non-volatile weight of the aqueous coating composition and/or wherein the coating composition includes no more than about 800 ppm of the transition metal catalyst based on the total amount of transition metal in the catalyst relative to the total non-volatile weight of the aqueous coating composition.

In other aspects or embodiments, the aqueous coating composition of the previous or following paragraphs of this Summary may also include or exhibit any of the following individually or in combination: when applied to a cleaned and chrome-free pretreated aluminum panel and cured for 12 seconds to a peak metal temperature of 249° C. to achieve a dried film thickness of approximately 12 grams per square meter and formed into a fully converted 202 standard opening beverage can end, passes less than 5 milliamps of current while being exposed for 4 seconds to an electrolyte solution containing 1% by weight of NaCl dissolved in deionized water; and/or wherein the aqueous coating composition, when applied to a cleaned and chrome-free pretreated aluminum panel and cured for 12 seconds to a peak metal temperature of 249° C. to achieve a dried film thickness of approximately 12 grams per square meter, exhibits, if any, 0.5 mm or less of feathering; and/or when applied to a cleaned and chrome-free pretreated aluminum panel and cured for 12 seconds to a peak metal temperature of 249° C. to achieve a dried film thickness of approximately 12 grams per square meter, exhibits, a blush rating after pasteurization of at least 6 and/or wherein the aqueous coating composition has a viscosity at 25° C. measured via ASTM D-1200 of 35 to 60 seconds using a number 4 Ford cup.

In further aspects or embodiments, the aqueous coating compositions of the previous or following paragraphs of this Summary may include further optional features or components. These further optional features or components may include any combination of the following aspects and/or embodiments: wherein the aqueous coating composition has about 30% to about 35% weight percent solids; and/or wherein the carrier fluid includes one or more water-miscible organic solvents and/or wherein the water-miscible organic solvent comprises isopropyl alcohol, ethanol, methanol, butyl alcohol, amyl alcohol, diols, glycol ethers, glycol esters, acetone, methyl ethyl ketone, or tetrahydrofuran, or mixtures thereof and/or wherein the coating composition comprises from about 15% to about 3.5% weight percent of the one or more water-miscible organic solvents and/or wherein the coating composition includes at least about 5 weight percent of one or more organic solvents; and/or wherein the coating composition is substantially free of each of bisphenol A, bisphenol F, or bisphenol S, or any epoxides thereof; and wherein the coating composition is optionally substantially free of styrene; or wherein the coating composition does not contain any bispherol A, bispherol F, bispherol S, epoxides thereof, or styrene or structural units derived from bispherol A, bispherol F, bispherol S, epoxides thereof, or styrene; and/or wherein the aqueous coating composition is substantially free of formaldehyde or structural units derived from formaldehyde, or does not contain any formaldehyde or structural units derived from formaldehyde; and/or further including a lubricant; and/or wherein the lubricant is selected from Carnauba wax, polyethylene-based wax, Fischer-tropsch wax, fatty acid ester wax, silicon-based wax, lanolin wax, hydroxyl-functional poly siloxane wax or combinations thereof; and/or wherein the coating composition includes at least about 25 weight percent of water.

In yet further aspects or embodiments, an article is described herein wherein the article comprises a metal substrate having a riveted food or beverage can end with a coating disposed on at least a portion of the riveted beverage can end and wherein the coating is formed from the aqueous coating composition as described in any of the embodiments and/or aspects of the preceding or following paragraphs of this Summary. In other embodiments, the coating is present as an interior food-contact coating.

In further aspects or embodiments, the article of the previous or following paragraphs of this Summary may include further optional features or components. These further optional features or components may include any combination of the following aspects and/or embodiments: wherein the coating passes less than 5 milliamps of current when tested as described herein; and/or wherein the coating exhibits feathering, if any, of less than 0.5 millimeters when tested as described herein; and/or wherein the coating has an average dry coating thickness of about 7 micrometers to about 15 micrometers and/or wherein the metal substrate of the food or beverage can end has an average thickness of about 175 to about 230 micrometers and/or wherein the metal substrate of the food or beverage can end includes aluminum or steel and/or wherein a surface of the metal substrate is pretreated with a chromium-based or non-chromium-based (zirconium and acrylic-based) treatment prior to coating with the aqueous coating composition.

In yet further aspects or embodiments, a method is described herein where the method includes applying the aqueous coating composition of any previous or following embodiment or aspect as described the prior or following paragraphs of this Summary to a surface of a substrate for forming a beverage container end, and curing the aqueous coating composition to form a cured coating on the surface of the substrate.

In further aspects or embodiments, the methods of the previous or following paragraphs of this Summary may include further optional features or components. These further optional features or components may include any combination of the following aspects and/or embodiments: wherein the substrate is aluminum or steel; and/or wherein applying the aqueous coating composition to the surface of the substrate includes applying the aqueous coating composition on a continuously moving surface traveling at a line speed of about 50 meters per mminute to about 400 meters per minute; and/or wherein the curing is for about 8 to about 15 seconds of oven cure time to achieve at a peak metal temperature of about 200 to about 260° C.; and/or wherein the applied coating has an average dry coating thickness of about 7 micrometers to about 15 micrometers; and/or wherein the substrate has an average thickness of about 175 to about 230 micrometers; and/or further comprising forming a beverage can end from the coated substrate and wherein the coating passes less than 5 milliamps of current when tested as described herein; and/or further comprising forming a beverage can end from the coated substrate and wherein the coating exhibits feathering, if any, of about 0.5 millimeters or less when tested as described herein.

In yet other aspects or embodiments, a method is included herein that comprises causing the aqueous coating composition of any of prior aspect or embodiment as described in the previous or following paragraphs of this Summary to be used as a beverage can end coating composition. In some embodiments, the coating is used as an interior coating on a riveted beverage can end.

In yet other aspects or embodiments, the aqueous coating composition, article, or method of any preceding aspect, embodiment or paragraph of this Summary is not prepared using halogenated monomers, or is substantially free of, completely free of or does not contain halogenated monomers; and/or wherein the aqueous coating composition forms a coating that includes less than 50 ppm extractables, if any, when tested pursuant to the Global Extraction Test; and/or wherein the coating includes less than 50 ppm extractables, if any, when tested pursuant to the Global Extraction Test.

Definitions

The term "easy open end" refers to a container end (typically an end of a beverage container or can) that includes (i) a frangible opening portion (which for some beverage can ends functions as a drinking spout) and (ii) a riveted portion for attaching a pull tab thereto for purposes of opening the frangible opening portion to access the product housed within a can or container.

The term "food-contact surface" refers to a surface of an article (e.g., a beverage container) that is in contact with, or intended for contact with, a beverage product.

The term "organo" or "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds.

The term "water-dispersible" in the context of a water-dispersible polymer or a water-dispersible catalyst means that the polymer or catalyst can be mixed into water (or an aqueous carrier) to form a stable mixture. For example, a mixture that readily separates into immiscible layers is not a stable mixture. The term "water-dispersible" is intended to include the term "water-soluble." In other words, by definition, a water-soluble polymer or catalyst is also considered to be a water-dispersible polymer or catalyst. As used herein, "water-dispersible" means the component (catalyst or polymer component, for instance) does not visibly separate after 4 months at room temperature (25° C.) or 1 month at elevated temperatures (40° C.).

The term "dispersion" in the context of a dispersible polymer refers to the mixture of a dispersible polymer and a carrier fluid. The term "dispersion" is intended to include the term "solution."

A group that may be the same or different is referred to as being "independently" something. Substitution is anticipated on the organic groups of the compounds of the present invention. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, for example, "alkyl group" includes ether groups, haloalkyls, nitroalkyls, carboxyalkyls, hydroxyalkyls, sulfoalkyls, etc.

As used herein, "acrylate resin" means a resin that includes acrylate and/or methacrylate monomers, oligomers, and/or polymerizable polymers. As used herein, "(meth) acrylate" is a shorthand reference to acrylate, methacrylate, or combinations thereof, and "(meth)acrylic" is a shorthand reference to acrylic, methacrylic, or combinations thereof. The term "acrylic component" includes any compound, polymer, or organic group formed from, or containing, an acrylate or methacrylate compound (e.g., acrylic or methacrylic acid and esters thereof). As discussed in further detail below, the acrylic component may also additionally be formed from, or contain, one or more other vinyl monomers.

As used herein, "cross linker" refers to molecule capable of forming a covalent linkage between polymers or between two different regions of the same polymer.

As used herein, "polymer" and "copolymer" refer to molecule that includes a large number of similar units banded together with covalent bonds. The terms "polymer" and "copolymer" are interchangeable and may refer to a homopolymer that is formed from repeating units of one structural unit or monomer as well as a copolymer that may be formed from different types of structural units or monomers.

As used herein, "monomer" or reactant generally refers to a compound within a reaction mixture prior to polymerization and monomer units or (alternatively) repeating units or structural units refers to the monomer or reactant within the polymer. Preferably, the various monomers or reactants herein are randomly polymerized monomer units, structural units, or repeating units. If the discussion herein refers to a monomer or reactant, it also implies the resultant monomer unit, structural unit, or repeating unit thereof in the polymer. Likewise, if the discussion refers to a monomer unit, structural unit, or repeating unit, it also implies the monomer or reactant mixture used to form the polymer with the associated units therein.

As used herein, the term "substantially free" when used with respect to a composition that may contain a particular compound means that the composition contains less than 1,000 parts per million (ppm) of the recited compound regardless of the context of the compound in the composition (e.g., regardless of whether the compound is present in unreacted form, in reacted form as a structural unit of another material, or a combination thereof). The term "essentially free" when used with respect to a composition that may contain a particular compound means that the composition contains less than 100 parts per million (ppm) of the recited compound regardless of the context of the compound in the composition (e.g., regardless of whether the compound is present in unreacted form, in reacted form as a structural unit of another material, or a combination thereof). The term "essentially completely free" when used with respect to a coating composition that may contain a particular compound means that the coating composition contains less than 5 parts per million (ppm) of the recited compound regardless of whether the compound is mobile in the coating or bound to a constituent of the coating. The term "completely free" when used with respect to a composition that may contain a particular compound means that the composition contains less than 20 parts per billion (ppb) of the recited compound regardless of the context of the compound in the composition (e.g., regardless of whether the compound is present in unreacted form, in reacted form as a structural unit of another material, or a combination thereof). When the phrases "free", "free of" (outside the context of the aforementioned phrases), "do not contain", "does not contain", "does not include any" and the like are used herein, such phrases are not intended to preclude the presence of trace amounts of the pertinent structure or compound which may be present but were not intentionally used, e.g., the presence of environmental contaminants.

The term "epoxy-free", when used herein in the context of a polymer, refers to a polymer that does not include any "epoxy backbone segments" (viz., segments formed from reaction of an epoxy group and a group reactive with an epoxy group). By way of example, a polymer made from ingredients including an epoxy resin would not be considered epoxy-free. Similarly, a polymer having backbone segments that are the reaction product of a bisphenol (e.g., bisphenol A, bisphenol F, bisphenol S, 4,4'dihydroxy bisphenol, etc.) and a halohydrin (e.g., epichlorohydrin) would not be considered epoxy-free. However, a vinyl polymer formed from vinyl monomers or oligomers that include a pendant epoxy moiety (e.g., glycidyl methacrylate) would be considered epoxy-free because the vinyl polymer would be free of epoxy backbone segments. Coating compositions that are referred to as "epoxy-free" are not made using any polymers or other material having epoxy backbone segments.

The terms "Adhesion Test," "Blush Resistance Test," "Stain Resistance Test," and "Porosity Test" refer, respectively, to the adhesion, blush resistance, stain resistance, and porosity test methodologies described in the Test Methods section below. The Adhesion Test, Blush Resistance Test, Stain Resistance Test, and Porosity Test are collectively referred to as the "Coating Property Tests." Each of these respective tests is by definition performed after a coating composition of the present invention is suitably cured and retorted or pasteurized pursuant to the retort method or pasteurization method included in the Test Methods section below.

The term "retort" generally refers to conditions associated with food or beverage preservation or sterilization that include a temperature of 100° C. or higher. To achieve temperatures higher than 100° C., conditions associated with retort also frequently include pressures in excess of atmospheric pressure. The term "retortable" generally refers to the ability of a coating to withstand exposure to one or more such conditions and still exhibit one or more suitable film or coating properties.

Feathering is a term used to describe the adhesion loss of a coating on the tab of a food or beverage can or container end. When a food or beverage can or container is opened, a portion of free film may be present across the opening of the container or can if the coating loses adhesion on the tab. Such portion of free film is considered feathering.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the terms "comprises" and variations thereof do not have a limiting meaning where these terms appear in the description and claims. As used herein, "a,"

"an," "the," "at least one," and "one or more" are used interchangeably. Thus, for example, a coating composition that comprises "an" amino crosslinker can be interpreted to mean that the coating composition includes "one or more" amino crosslinkers. Also herein, the recitations of numerical ranges by endpoints include all numbers subsumed within that range as well as all ranges of various endpoints therewithin (e.g., 1 to 5 includes 1, 1.5, 2, 2.75, 3, 3.80, 4, 5, etc. and the range 1 to 5 includes 1 to 4, 1 to 3, 1 to 2, 2 to 5, 2 to 4, and so forth).

The above summary and definitions of the present disclosure is not intended to describe each disclosed embodiment or every implementation thereof. The description that follows more particularly exemplifies illustrative embodiments, aspect, or approaches. In several places throughout the application, guidance is provided through lists of examples, which examples can be used in various combinations. In each instance, the recited list serves only as a representative group and should not be interpreted as an exclusive list.

DETAILED DESCRIPTION

The present disclosure provides an aqueous coating composition for beverage containers, such as interior food contact surfaces thereof including an easy open end of the beverage container. In other approaches, the disclosure provides a beverage container including such aqueous coating composition, and in further approaches, methods of applying the aqueous coating composition to a metal substrate suitable for the container (and container end thereof) using coating applications. In one aspect, the aqueous coating composition may include at least a binder system, a cross linker, and a catalyst. In preferred embodiments, the aqueous coating composition is a coating composition. (Hereinafter, for convenience, the aqueous coating composition of the disclosure may be referred to as a "coil coating composition", but it should be understand that it can also be applied using non-coil coating processes (e.g., roll coating, spray coating, wash coating and the like) and may be used, for example, to coat non-coil metal sheet that is subsequently formed into easy open food or beverage can ends.) In another aspect, the present disclosure provides a beverage container and/or a metal substrate thereof having at least a portion thereof coated with the aqueous coil coating composition. In yet other aspects, the present disclosure provides methods of coil coating a beverage container and/or a metal substrate suitable for the beverage container and in particular the easy open end of the beverage container. The methods may include forming the aqueous coil coating composition as described herein and applying the composition to a metal substrate using coil coating methods. Alternatively, the compositions herein may also be applied to metal substrates either before or after forming the metal substrate into a beverage container or portion thereof using other suitable beverage can end application techniques.

The binder system, in one approach, may be a polyolefin binder system such as a polyolefin dispersion or aqueous polyolefin dispersion. The polyolefin binder system may include structural or monomer units derived from two or more C2 to C12 alpha olefins and may include other optional structural units and/or other optional binder resins as needed for a particular application. For instance, the binder system of the present invention can include one or more optional structural units or optional binding resins including acid functional groups (e.g., carboxylic groups), hydroxyl groups, amine, aldehyde, ester, ethoxylate, oxirane groups, or combinations thereof. Preferably, the binder systems herein are water-dispersible binder systems.

The compositions herein include a cross linker. In some approaches, the cross linker is a nitrogen-containing carboxyl-reactive cross linker. In preferred approaches, the cross linker may be a hydroxyalkylamide cross linker. Such cross linkers allow for production of a formaldehyde-free and epoxy-free coil coating composition having sufficient flexibility and corrosion resistance at the same time for use as an interior or exterior coating of a beverage can and, in particular, container ends including rivets. In approaches, the cross linker can have any suitable combination of one or more carboxyl-reactive functional groups, and more preferably includes two or more such groups. Hydroxyl groups are preferred carboxyl-reactive groups. Other suitable carboxyl-reactive groups may include thiol groups. In some embodiments, the cross linker includes two or more, three or more, or four or more hydroxyl groups.

The compositions herein also include a catalyst. The catalyst, in preferred approaches, is a water-dispersible (and preferably water-soluble) transition metal catalyst, and more preferably an organometallic transition metal catalyst. In an approach, the organometallic catalyst includes at least one metal selected from aluminum (Al), cobalt (Co), iron (Fe), titanium (Ti), zinc (Zn), zirconium (Zr), or mixtures thereof. The catalyst may be an organometallic catalyst having organic ligands such that the catalyst is water soluble, and/or water-dispersible.

The coil coating compositions herein are suitable for metal substrates and coil coating conditions and application methods. In some approaches, the metal substrate is a metal typically used in the beverage packaging industry. In one approach, the metal substrate includes steel, aluminum, or a combination thereof. Preferably, the metal substrate is aluminum, and more preferably a chromium-free, pre-treated aluminum. The metal substrate may be formed into a beverage can end and may include a riveted beverage can end.

The unique combination of the binder system, cross linker, and catalyst herein enables non-formaldehyde and non-epoxy binder systems to achieve the robust performance needed for beverage container end applications even when using short cure cycles. This unique combination of components, among other features, unexpectedly decreases the energy required for cross linking and achieves a high level of product resistance and flexibility at the same time generally required for the internal coating (and in particular the easy open end) of beverage metal packaging. In some approaches, the performance can be obtained without the need for melamine and/or formaldehyde cross linkers. In addition, the resulting coating is capable of exhibiting such beneficial coating properties, while also exhibiting excellent feathering properties.

For coil coating applications and beverage container ends, the curing process of the coil coating application is often very short (such as, flash peak metal temperatures of about 200° C. to about 260° C. (in other approaches, about 230 to about 260° C.) achieved in about 8 to 20 seconds oven cure time, preferably, about 8 to about 15 seconds oven cure time, more preferably, about 8 to about 14 seconds oven cure time, and even more preferably, about 10 to about 12 seconds oven cure time. Such short flash curing conditions for coil coating production is not robust enough to get good coating performances in the context of prior polyolefin binder systems unless the unique combinations of components discovered herein are utilized together. In some approaches, the coil coating compositions herein do not include any intentionally added bisphenol components (such as bisphenol A or bisphenol F), are formaldehyde-free, and suitable for a water-based formation including the polyolefin-based binder systems herein. In some such approaches, the coil coating compositions are further styrene-free and/or epoxy-free. Further details of the compositions and methods are provided below.

Binder System: The polyolefin binder system of the aqueous coil coating compositions herein preferably includes a base polymer including at least one polyolefin polymer with monomer units or structural units derived at least from reactants including two or more C2-C12 alpha-olefins and, in some approaches, an aqueous dispersion of the two or more alpha-olefins. In some such approaches, the polyolefin polymer of the binder system is derived from ethylene and one or more C3-C12 alpha-olefins and, in one example, includes ethylene structural units (or ethylene monomer moieties) as well as C3 to C12 structural units (or C3 to C12 monomer moieties). In further such approaches, the polyolefin polymer of the binder system is derived from ethylene and one or more C3-C6 alpha-olefins or C3-C4 alpha-olefins. In one approach, the polyolefin binder system includes a polyolefin polymer with structural units derived from ethylene and propylene. As used herein, an ethylene structural unit (or monomer moiety) generally refers to a —$H_2C$—$CH_2$— unit within a copolymer chain, which is derived from an ethylene molecule or reactant during copolymerization, with a similar definition applying to C3-C12 alpha-olefin structural units (or monomer moieties). As used herein, an olefin may also generally refer to a family of organic compounds that are alkenes with a chemical formula $C_xH_{2x}$, where x is the carbon number and having a double bond within its structure.

The coating compositions herein include about 90% to about 40% weight percent of the polyolefin binder system, preferably about 80% to about 50% weight percent of the polyolefin binder system, and even more preferably about 70% to about 60% weight percent of the polyolefin binder system based on the total weight of the composition. In terms of resin solids, the coating compositions herein include about 40% to about 20% weight percent of the polyolefin binder system, preferably about 36% to about 23% weight percent of the polyolefin binder system, and even more preferably about 32% to about 28% weight percent of the polyolefin binder system based on the total weight of resin solids in the composition The polyolefin polymer may have a number average molecular weight suitable for can coating applications and may be greater than about 1,000; greater than about 5,000; greater than about 10,000; greater than about 15,000; or even greater than about 50,000

In some optional approaches, the polyolefin polymer may include from about 1 to about 40 percent by weight of structural units derived from one or more alpha-olefin comonomers. In other approaches, the weight percent of structural units derived from the one or more alpha-olefin comonomers is from about 1 to about 35 percent, from about 1 to 30 percent by weight, from about 3 to about 27 percent by weight, from about 3 to about 20 percent by weight, or from about 3 to about 15 percent by weight of units derived from one or more alpha-olefin comonomers.

The term alpha-olefin refers to olefins having a double bond within its structure at the primary or alpha position. The C2-C12 alpha-olefin monomer moieties or structural units have a carbon number from two to twelve. Thus, the carbon number of the C2-C12 alpha-olefin monomer moieties may be 2, 4, 5, 6, 7, 8, 9, 10, 11, or 12. For example, the C3-C12 alpha-olefin monomer moieties or structural units may be derived from a propylene reactant. In other embodiments, the C2-C10 alpha-olefin monomer moieties may be derived from reactants including but are not limited to, homopolymers and copolymers (including elastomers) of one or more alpha-olefins such as ethylene, propylene, 1-butene, 3-methyl-1-butene, 4-methyl-1-pentene, 3-methyl-1-pentene, 1-heptene, 1-hexene, 1-octene, 1-decene, and/or 1-dodecene. The resultant polymers may be polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene, as can be represented by ethylene-butadiene copolymer and ethylene-ethylidene norbornene copolymer; and polyolefins (including elastomers) such as copolymers of two or more alpha-olefins with a conjugated or non-conjugated diene, as can be represented by ethylene-propylene-butadiene copolymer, ethylene-propylene-dicyclo pentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene-(meth)acrylate copolymer. Suitable polyolefin dispersions for the binder systems may include polyolefin dispersions in the CANVERA commercial line of products from Dow Chemical such as, for example, the CANVERA 1340 and 1350 polyolefin dispersions.

In some embodiments, the polyolefin binder system includes a base polyolefin polymer that is not readily dispersible in water by itself. Examples of such base polyolefin polymers include higher molecular weight polyolefin polymers that do not include polar functional groups and may be thermoplastic polymers. Examples include non-functionalized ethylene polymers, non-functionalized propylene polymers, non-functionalized propylene/ethylene copolymers, and copolymers and combinations thereof. Such base polyolefin polymers typically have number average molecular weights in excess of 10,000, 15,000, 20,000, or even 50,000. In preferred embodiments, the polyolefin binder system includes either one or more base polyolefin polymers in combination with a polymeric stabilizing agent, and optionally, a compatibilizer (more preferably a polymeric coupling agent). The polymeric stabilizing agent is typically a hydrophilic material that is water-dispersible on its own. Preferred polymeric stabilizing agents are acid-functional or anhydride-functional. Suitable such polymeric stabilizing agents may include, e.g., ethylene (meth)acrylic acid copolymers such as those sold by The Dow Chemical Company under the PRIMACOR line of products, as well as any other water-dispersible polymers disclosed herein. Processes and materials for forming stable aqueous dispersion of such polyolefin polymers are disclosed, for example, in U.S. Pat. No. 8,193,275 (Moncla et al.), U.S. Pat. No. 8,946,329 (Wilbur et al.), U.S. Pat. No. 9,169,406 (Wilbur et al.), U.S. Pat. No. 8,722,787 (Romick et al.), and U.S. Pat. No. 9,938,413 (Romick et al.). In some examples, the one or more base polyolefin polymers can be melt blended in a suitable process (e.g., an extrusion process such as Dow's BLUEWAVE process) to yield an aqueous dispersion including both the base polyolefin polymer stably dispersed therein and the polymeric stabilizing agent.

In other approaches, the polyolefin binder system may also include other structural units, such as acid-functionalized structural units or, alternatively, may include acid-functionalized polyolefin polymers, which may be an interpolymer of an olefin structural unit as described above and one or more olefinically-unsaturated organic co-monomers. The other functional polymers may be the stabilizing agent or a stabilizing and/or surfactant agent. In one approach, the co-monomers or separate polymers may be (meth)acrylates, vinyl esters, and/or olefinically unsaturated carboxylic acids. In some approaches, the acid- or anhydride-functionalized polyolefin polymers and/or structural units may be polymers and/or moieties of at least ethylene interpolymerized with (meth)acrylic acid in the form of ethylene-(meth)acrylic acid polymers The acid- or anhydride-functionalized copolymer or structural units may include structural units or moieties derived from one or more C2-C12 olefins as described above, such as ethylene, and one or more α, β-ethylenically unsaturated carboxylic acid (such as, (meth)acrylic acid). In other approaches, the polymers or binder systems may include a polar group as either a co-monomer or grafted monomer. Exemplary polar polyolefins may also include, but are not limited to, acylated or acyl grafted polyolefin polymers.

In some approaches, a suitable acylating agent to provide a polar group or graft is an unsaturated substituted or un-substituted organic acid or anhydride, for example, maleic or fumaric reactants (or anhydride derivatives thereof) of the Formula I below:

(Formula I)

wherein $R_1$ and $R_2$ are the same or different, provided that at least one of $R_1$ and $R_2$ is a group that is capable of reacting to esterify alcohols, form amides or amine salts with ammonia or amines, form metal salts, e.g., with reactive metals or base reacting metal compounds (ammonia, amines, and the like), or otherwise functioning as an acylating agent. Typically, $R_1$ and/or $R_2$ is —OH, —O-hydrocarbyl, —NH$_2$, and taken together $R_1$ and $R_2$ can be —O— so as to form an anhydride. In some embodiments, $R_1$ and $R_2$ are such that both carboxylic functions can enter into acylation reactions.

Maleic anhydride is one suitable acylating agent. Other suitable acylating agents include electron-deficient olefins such as monophenyl maleic anhydride; monomethyl maleic anhydride, dimethyl maleic anhydride, N-phenyl maleimide and other substituted maleimides; isomaleimides; fumaric acid, maleic acid, alkyl hydrogen maleates and fumarates, dialkyl fumarates and maleates, fumaronilic acids and maleanic acids; and maleonitrile and fumaronitrile. Maleic anhydride grafted polyethylene homopolymer or copolymer, maleic anhydride grafted polypropylene homopolymer or copolymer, ethylene-acrylic acid (EAA) and ethylene-methacrylic acid copolymers are suitable binder resins herein such as those available under the trademarks PRIMACOR™, commercially available from The Dow Chemical Company (and particularly the PRIMACOR 5980i product, which according to Dow literature is an ethylene-acrylic acid copolymer), NUCREL™, commercially available from E.I. DuPont de Nemours, and ESCOR™, commercially available from ExxonMobil Chemical Company and described in U.S. Pat. Nos. 4,599,392; 4,988,781; and 5,938,437. Other examples of polymeric stabilizing agents include, but are not limited to, ethylene ethyl acrylate copolymers, ethylene methyl methacrylate copolymers, ethylene butyl acrylate copolymers, and combinations thereof as functionalized per the discussions herein. Other ethylene-carboxylic acid copolymers may also be used. Those having ordinary skill in the art will recognize that a number of other useful polymers may also be used.

The polymeric stabilizing agent may have any suitable acid number so long as the polymer is capable of being stably dispersed into water. Preferred acid- or anhydride-functional polymeric stabilizing agents have an acid number of at least about 40, more preferably at least about 55, and even more preferably at least about 70, and optimally at least 100 milligrams (mg) KOH per gram of the polymer. While the upper range of suitable acid numbers is not particularly restricted, typically the acid number will be less than about 400, less than about 300, or less than about 200 mg KOH per gram of the polymer. Acid numbers referred to herein may be determined pursuant to BS EN ISO 3682-1998 standard, or alternatively may be theoretically determined based on the reactant monomers.

In some approaches, the coating compositions herein may also include the optional compatibilizer. The compatibilizer can help in formation of the aqueous dispersion, such as, help provide a more uniform dispersion, and/or improve properties of a cured coating composition. Compatibilizers may also be referred to as coupling agents or polymeric coupling agents.

The compatibilizer, in some approaches, can include a modified or functionalized polymer and optionally a low molecular weight compound having reactive polar groups. Examples of the compatibilizer include, but are not limited to modified olefin polymers. The modified olefin polymers can include graft copolymers and/or block copolymers, such as propylene-maleic anhydride graft copolymer. Examples of groups that can modify the polymer include, but are not limited to, acid anhydrides, carboxylic acids, carboxylic acid derivatives, primary and secondary amines, hydroxyl compounds, oxazoline and epoxides, and ionic compounds, and combinations thereof. Specific examples of the groups that can modify the polymer include, but are not limited to, unsaturated cyclic anhydrides and their aliphatic diesters, and the diacid derivatives. For example, maleic anhydride and compounds selected from $C_1$-$C_{10}$ linear and branched dialkyl maleates, $C_1$-$C_{10}$ linear and branched dialkyl fumarates, itaconic anhydride, $C_1$-$C_{10}$ linear and branched itaconic acid dialkyl esters, maleic acid, fumaric acid, itaconic acid, and combinations thereof. Commercially available examples of compatibilizers include, but are not limited to, polymers available, under the trade names LICOCENE® from Clariant Corporation, such as LICOCENE® 6452, which is a propylene-maleic anhydride graft copolymer; EXXELOR™ from ExxonMobil Chemical Company; and Epolene from Westlake Chemical Company.

In yet other approaches, the polyolefin binder system may further include an emulsion polymerized ethylenically unsaturated monomer component. In some embodiments, some or all of the ethylenically unsaturated monomer component is polymerized in the presence of an aqueous dispersion of the polyolefin binder system. For further discussion of materials and methods relating to the emulsion polymerized ethylenically unsaturated monomer component see, for example, U.S. Pat. No. 9,404,006 (Li) and U.S. Publ. No. 2019/0292398 (Gao et. al.).

In preferred embodiments, the polyolefin binder system is not prepared using halogenated monomers such as chlorinated vinyl monomers. In further preferred embodiments, the coating composition is substantially free of, completely free of, or does not contain halogenated monomers (whether free or polymerized).

In alternative approaches, the binder system includes thermoplastic polyesters. For instance, and in some optional approaches, the aqueous dispersion of the binder system may include a melt blend of one or more polyester resins (such as polyethylene terephthalate polyester resins obtained from suitable dicarboxylic acid components and diol components), one or more stabilizing agents (such as at least one second polyester or other water-dispersible polymer), one or more neutralizing agents; and water. Exemplary thermoplastic polyesters are described, for example, in U.S. Pat. Nos. 2,936,296, 5,955,565, and 5,859,116. The one or more stabilizing agents suitable for the thermoplastic polyester dispersions may include one or more second polyesters to promote the formation of a stable dispersion. In some approaches, the second polyester has a carboxylic acid group and an acid number of about 15 or more based on the solid content of the second polyester or may be a self-dispersing sulfopolyester. The neutralizing agent may be a base, such as ammonium hydroxide, sodium hydroxide, or potassium hydroxide. Other neutralizing agents can include lithium hydroxide or sodium hydroxide, a carbonate, or an amine such as monoethanolamine, or 2-amino-2-methyl-1-propanol (AMP). Amines useful in embodiments disclosed herein may include diethanolamine, triethanolamine, and TRIS AMINO™ (each available from Angus), NEUTROL™ TE (available from BASF), as well as triisopropanolamine, diisopropanolamine, and N,N-dimethylethanolamine (each available from The Dow Chemical Company, Midland, Mich.). Alternatively, non-melt blend polyester dispersions may be prepared as described in WO 2018/118802.

Cross linker: In certain embodiments, the aqueous coating compositions (typically coil coating compositions) may be formulated using one or more curing agents or cross linking resins, sometimes referred to as cross linkers. The choice of particular cross linker typically depends on the particular product being formulated. In some instances, the use of certain nitrogen-containing carboxyl-reactive cross linkers are preferred for the aqueous coating compositions. Suitable nitrogen-containing carboxyl-reactive cross linkers include hydroxyalkylamide cross linkers and allow for production of a formaldehyde-free aqueous coating composition including the polyolefin binder system above having sufficient flexibility for use as an interior or exterior coating of a food or beverage can, and particularly an as interior or exterior coating of an easy open beverage can end. The coating compositions herein include about 30% to about 0.5% weight percent of the cross linker, preferably about 20% to about 2% weight percent of the cross linker, and even more preferably about 15% to about 3% weight percent of the cross linker based on the total weight of the composition. In terms of resin solids, the coating compositions herein include about 9% to about 0.15% weight percent of the cross linker, preferably about 6% to about 0.6% weight percent of the cross linker, and even more preferably about 1.5% to about 0.9% weight percent of the cross linker based on the total weight of resin solids in the composition.

The nitrogen-containing carboxyl-reactive cross linker can have any suitable combination of one or more carboxyl-reactive functional groups, and more preferably includes two or more such groups. Hydroxyl groups are preferred carboxyl-reactive groups. Other suitable carboxyl-reactive groups may include thiol groups. In some embodiments, the nitrogen containing carboxyl-reactive cross linker includes two or more, three or more, or four or more hydroxyl groups.

The nitrogen-containing carboxyl-reactive cross linker can include any suitable number of nitrogen atoms, although it will typically include two or more nitrogen atoms, and, in some embodiments, two total nitrogen atoms. In other embodiments, one or more (and more preferably two or more) nitrogen atoms are present in an amide group, an aziridine group, an imide group, a diimide group, an oxazoline group, a urethane group, or a combination thereof. In some approaches, the nitrogen-containing carboxyl-reactive cross linker includes two or more amide groups. In yet other approaches, the nitrogen-containing carboxyl-reactive cross linker may contain a single amide group such as, for example, a poly-substituted amide group having two or more hydroxyl groups. In a preferred approach, the nitrogen-containing carboxyl-reactive cross linker includes a beta-hydroxyl group relative to a nitrogen atom of an amide bond.

In certain preferred approaches, the nitrogen containing carboxyl-reactive cross linker includes one or more, and more preferably two or more, groups having the structure of the below Formula II:

HO—$R_3$—N($R_4$)—C(=O)—    (Formula II)

wherein each $R_3$ is independently an organic group, and each $R_4$ is independently hydrogen or an organic group. As shown in Formula II, the depicted hydroxyl group can be a primary hydroxyl group, secondary hydroxyl group, or tertiary hydroxyl group depending on the structure of $R_3$. In some embodiments, the hydroxyl group is a primary hydroxyl group.

In Formula II, $R_3$ can include any suitable number of carbon atoms, but will typically include from 2 to 10 carbons atoms, more typically from 2 to 8 carbon atoms, more typically from 2 to 6 carbons atoms, and even more typically from 2 to 4 carbon atoms. $R_3$ will typically include at least two carbon atoms in a chain connected on one end to the depicted nitrogen atom and on the other end to the depicted hydroxyl group. In an embodiment, the depicted hydroxyl group is attached directly to a first carbon atom, which is attached directly to a second carbon, which is in-turn attached directly to the depicted nitrogen atom. In some embodiments $R_3$, is a —$(CH_2)_2$— moiety. In yet other approaches, $R_3$ is an alkylene group preferably containing from 1 to 5 carbon atoms (e.g., methylene, ethylene, n-propylene, sec-propylene, n-butyl, sec-butylene, tert-butylene, pentylene, etc.).

In some approaches, $R_4$ is an organic group that includes a hydroxyl group. In some such embodiments, $R_4$ has the structure HO—$R_3$—, wherein $R_3$ is as described above. Examples of such $R_4$ groups include hydroxyl alkyl groups preferably having from 1 to 5 carbon atoms (e.g., hydroxyethyl, 3-hydroxy-propyl, 2-hydroxy-propyl, 4-hydroxybutyl, 3-hydroxy-butyl, 2-hydroxy-2-propyl-methyl, 5-hydroxy-pentyl, 4-hydroxy-pentyl, 3-hydroxy-pentyl, 2-hydroxy-pentyl and the pentyl isomers). One example of a nitrogen containing carboxyl-reactive cross linker including such $R_4$ groups is provided below in Formula III (which is believed to be the structure of the PRIMID XL-552 product commercially available from EMS):

(Formula III)

In other embodiments, the nitrogen containing carboxyl-reactive cross linker is a compound having the structure of the below Formula IV $(HO-R_3-N(R_4)-C(=O))_n-X$, (Formula IV)

wherein $R_3$ and $R_4$ are as described above, n is an integer of 2 or more, and X is a polyvalent organic group. In yet other approaches, the nitrogen containing carboxyl-reactive cross linker is a compound having the structure of Formula V $HO-R_3-N(R_4)-CO-X-CO-N(R_4)-(R_3)-OH$ (Formula V)

wherein $R_3$ and $R_4$ of Formula V are independently organic groups, X is a bivalent organic group, and wherein the hydroxyl groups are independently primary or secondary hydroxyl groups. In some approaches, X is an alkylene group. In other approaches, X is a $-(CH_2)_m-$ group wherein (i) m is an integer of 1 or more, 2 or more, 3 or more, 4 or more, and more typically from 2 to 10 and (ii) one or more hydrogens may be replaced with substituent groups (e.g., organic substituent groups). In an embodiment, X is $-(CH_2)_4-$.

In certain embodiments, the hydroxyl group attached to the $R_3$ moiety or of the $R_4$ moiety of Formula IV or V is a secondary hydroxyl group or located in a beta position relative to a nitrogen atom, more preferably a nitrogen atom of an amide bond. Thus, for example, in certain embodiments, the nitrogen-containing carboxyl-reactive cross linker is a beta-hydroxyalkylamide compound. Some examples of such compounds include: bis[N,N-di(β-hydroxy-ethyl)]adipamie, bis[N,N-di(β-hydroxy-propyl)]succinamide, bis[N,N-di(β-hydroxy-ethyl)]azelamide, bis[N,N-di(β-hydroxy-propyl)]adipamide, bis[N-metil-N-(β-hydroxy-ethyl)]oxamide, and mixtures thereof. The PRIMID QM-1260 product commercially available from EMS is an example of a beta-hydroxyalkylamide cross linker. The structure believed to correspond to the PRIMID QM-1260 product is provided by Formula VI below:

(Formula VI)

Without intending to be bound by theory, the use of beta-hydroxyalkylamides, such as those of Formula IV, V, or VI, is preferred in some embodiments due to the formation of an oxazolinium intermediate that is believed to occur and result in enhanced reactivity of the cross linker with carboxyl groups. Thus, in some embodiments, the nitrogen containing carboxyl-reactive cross linker is preferably capable of forming an oxazolinium intermediate or other carbon-nitrogen heterocyclic intermediate having enhanced reactivity with carboxyl groups. Preferably, such reactive intermediates are formed under the short cure time of typical beverage can ends coating thermal cure conditions. For example, for coating cure conditions, such reactive intermediates may be formed in come embodiments even at oven bake conditions having a peak metal temperature from about 200 to about 260° C. (in some approaches, about 230 to about 260° C.) and during a relative short oven residence time of only about 8 to about 20 seconds, 8 to 15 seconds, 8 to 12 second, or even 10 to 12 seconds.

In preferred embodiments, the nitrogen-containing carboxyl-reactive cross linker is formed from reactants that do not include formaldehyde. Preferred curing agents are also substantially free of, and preferably do not include any structural units derived from, BPA and aromatic glycidyl ether compounds (e.g., BADGE, BFDGE, and epoxy novalacs).

In yet other approaches, the cross linker may include a carbodiimide polymer or the nitrogen-containing carboxyl-reactive cross linker may include a carbodiimide structural moiety. Exemplary carbodiimide cross linkers or moieties thereof may include, but are not limited to, aliphatic and/or cycloaliphatic dinitrogen derivatives of carbonic acid. Such cross-linkers have the structure: $R'N=C=NR'$ where R' is independently aliphatic or cycloaliphatic groups. The aliphatic group of R' may be a carbon chain of 1 to 6 carbon atoms. Suitable examples of carbodiimide moieties or cross linkers include dibutyl carbodiimide and dicyclohexyl carbodiimide. Polymeric or oligomeric carbodiimide cross linkers can also be used. Water dispersible carbodiimide cross linkers may be prepared by incorporating minor amounts of an amine, such as dimethyl aminopropylamine, and an alkyl sulfonate or sulfate into the carbodiimide structure. Suitable water dispersible carbodiimides can also be prepared by incorporating polyethylene oxide or polypropylene oxide into the carbodiimide structure.

Although carboxyl-reactive crosslinkers are preferred for reasons already discussed, other crosslinkers known for use in can coatings may additionally, or alternatively, be used. For example, any of the well-known, hydroxyl-reactive curing resins can be used. For example, phenoplast, blocked isocyanates, and aminoplast curing agents may be used, as well as combinations thereof.

Catalyst: The aqueous coating compositions of this disclosure preferably further include a catalyst, which in some approaches, is a transition metal catalyst. The transition metal catalyst is preferably an organometallic transition metal catalyst that is water-dispersible (and preferably water-soluble). The transition metal catalyst preferably includes at least one metal selected from aluminum (Al), cobalt (Co), iron (Fe), titanium (Ti), zinc (Zn), zirconium (Zr), or mixtures thereof, and in other approaches, titanium and/or zirconium.

In approaches, the organometallic transition metal catalyst includes one or more alkoxy ligands bound to a transition metal core or base. In some approaches, the one or more ligands are one or more alkoxycarbonyl ligands wherein the alkoxy or the alkoxycarbonyl ligands include a C1 to C6 alkyl group.

In one approach, the catalyst is an alkyl titanium oxide or salt thereof (or other alkyl transition metal oxide) preferably having the general structure $M(OR_5)_n$ wherein M is a transition metal selected from aluminum (Al), cobalt (Co), iron (Fe), titanium (Ti), zinc (Zn), zirconium (Zr), or mixtures thereof, each $R_5$ is independently a linear or branched organic group typically containing 1 to 6 carbon atoms and n is an integer from 1 to 4. In other approaches, the catalyst is a titanium oxide chelate or salt thereof (or other transition metal oxide chelate or salt thereof). In approaches, the transition metal chelates suitable for the aqueous coating compositions herein has the general structure of Formula VII below (Formula VII)

wherein R is an organic group, such as a C1 to C10 linear or branched carbon chain, n is 1 or 2; M is a transition metal preferably selected from aluminum (Al), cobalt (Co), iron (Fe), titanium (Ti), zinc (Zn), zirconium (Zr), or mixtures thereof; X is a bivalent organic linking group, such as a linear or branched carbon chain having 2 to 4 carbons; and Y is a functional group having an oxygen or nitrogen atom capable of forming a chelate with the central transition metal M. In approaches, Y is a carbonyl, ester, or salt thereof.

In particular approaches, the organometallic transition metal catalyst may be selected from titanium acetylacetonate, tetraalkyltitanates, isopropylorthotitanate, water-soluble titanium chelated salts (such as diammonium dihydroxybis[lactato(2)-$O_1O_2$]titanate(2-)), triethanolamine chelates of titanium, tetratriethanolamine chelates of titanium, lactic acid titanate chelate salts, or a combination thereof. Suitable commercially available titanium-containing catalysts may include, for example, those available under the trade names VERTEC IA10, PI2, TAA, TET, and XL900 (all from Johnson Matthey, Chicago Ill.); and TYZOR 131, LA, TE, IAM, and TPT (all from Du Pont de Nemours, Wilmington Del.).

In certain embodiments, the zirconium-containing catalyst is selected from the group consisting of zirconium propionate, zirconium acetate, ammonium zirconyl carbonate, zirconate (2)-bis[carbonato(2)-O]dihydroxy-diammonium, zirconium chelated salts (such as tetrakis [[2,2',2"-nitrilotris(ethanolato)](1)-N,O]zirconium), sodium zirconium lactate, sodium zirconium glycolate, and combinations thereof. Suitable commercially available zirconium-containing catalysts may include, for example, those available under the trade names BACOTE 20 (MEL Chemicals, Manchester, UK); TYZOR 217 and 218, and TEAZ (all from Du Pont de Nemours, Wilmington, Del.).

In preferred embodiments, the coating compositions, as disclosed herein, may include one or more catalysts at a suitable level to produce the desired result. In certain such preferred embodiments, the aqueous coating composition includes at least about 150 ppm of the transition metal catalyst, at least about 200 ppm of the catalyst, at least about 300 ppm of the catalyst, or at least about 400 ppm of the catalyst (all based on the total amount of transition metal in the catalyst relative to the total non-volatile weight of the aqueous coating composition). The other approaches, the aqueous coating composition also includes no more than about 500 ppm of the transition metal catalyst, no more than about 550 ppm of the catalyst, no more than about 600 ppm of the catalyst, or no more than about 750 ppm of the catalyst (again, all based on the total amount of transition metal in the catalyst relative to the total non-volatile weight of the aqueous coating composition). In yet other approaches, the compositions include up to about 1 weight percent catalyst, and in other approaches, about 0.2 to about 1 weight percent, or about 0.5 to about 1 weight percent, or even 0.5 to about 0.75 weight percent.

Carrier Fluid: the aqueous coating compositions herein may further include a carrier fluid or other fluid medium. In some approaches, this carrier fluid may be an aqueous carrier fluid. In particular, the carrier fluid medium may be any fluid suitable for coating compositions and may include or be water. The coating compositions herein may include about 70% to about 50% weight percent of the carrier fluid, such as water, (based on the total weight of the compositions). In other approaches, the composition may include from about 90% to about 30% percent by weight of the carrier fluid, in other approaches about 85% to about 35% weight percent, and in yet other approaches, about 80% to about 40% weight percent. In yet further approaches, the coating compositions of the present disclosure may include a carrier fluid in a range of at least about 30% weight percent, at least about 25% weight percent, or at least about 20% weight percent to about 10% weight percent or less, about 6% weight percent or less, or about 3% weight percent or less. The carrier fluid may be water and such percentages herein may reflect amounts of water in the compositions.

In some approaches, the amount of fluid carrier is selected so that the non-volatile solids content of the coating composition is in the range of from about 20% to about 40% percent by weight, based on the total weight of the composition. For example, the composition may include about 25% to 35% percent by weight of solid content based on the total weight of the composition. In other approaches, the solids content of the composition ranges from at least about 40% weight percent, at least about 38% weight percent, or at least about 38% weight percent to about 35% weight percent or less, about 33% weight percent or less, or about 30% weight percent or less.

In other approaches, carrier fluid may include one or more water-miscible organic solvents. In some approaches, the water-miscible organic solvents may include one or more of isopropyl alcohol, ethanol, methanol, butyl alcohol, amyl alcohol, diols, glycol ethers, glycol esters, glycol ether esters, mineral spirits, aromatic solvents, acetone, ketones such as methyl ethyl ketone, or tetrahydrofuran or mixtures thereof. If included, the aqueous coating compositions herein, the composition may include from about 16% to about 3.6% of the one or more water-miscible organic solvents.

In preferred embodiments, the carrier fluid includes at least some organic solvent, more preferably at least 5 weight percent, or at least 10 weight percent, or at least 15 weight percent, based on total coating weight, of one or more organic solvents. Typically, at least some, if not all, of the one or more organic solvents is water-miscible.

In preferred embodiments, the aqueous coating compositions herein are substantially free of each of bisphenol A, bisphenol F, and bisphenol S, as well as structural units derived therefrom. In certain embodiments, the aqueous coating compositions are essentially free of each of bisphenol A, bisphenol F, and bisphenol S, as well as structural units derived therefrom. In certain embodiments, the aqueous coating compositions are essentially completely free of each of bisphenol A, bisphenol F, and bisphenol S, as well as structural units derived therefrom. In certain embodiments, the aqueous coating compositions are completely free of each of bisphenol A, bisphenol F, and bisphenol S, as well as structural units derived therefrom. By way of example, a coating composition is not substantially free of bisphenol A that includes 600 ppm of bisphenol A and 600 ppm of the diglycidyl ether of bisphenol A (BADGE)—regardless of whether the bisphenol A and BADGE are present in the composition in reacted or unreacted forms, or a combination thereof.

In certain embodiments, the aqueous coating compositions herein are substantially free of all bisphenol compounds, as well as structural units derived therefrom. In certain embodiments, the aqueous coating compositions are essentially free of all bisphenol compounds, as well as structural units derived therefrom. In certain embodiments, the aqueous coating compositions are essentially completely free of all bisphenol compounds, as well as structural units derived therefrom. In certain embodiments, the aqueous coating compositions are completely free of all bisphenol compounds, as well as structural units derived therefrom. By way of example, hydroquinone, resorcinol, catechol, and the like are not bisphenols because these phenol compounds only include one phenylene ring.

The amount of bisphenol compounds (e.g., bisphenol A, bisphenol F, and bisphenol S), as well as structural units derived therefrom can be determined based on starting ingredients; a test method is not necessary and parts per million (ppm) can be used in place of weight percentages for convenience in view of the small amounts of these compounds. In preferred embodiments, no bisphenol compounds are used, although trace amounts may be present due, for instance, to environmental contamination.

In preferred embodiments, the aqueous coating compositions are substantially free, essentially free of, completely free of, and free of formaldehyde or structural units derived from formaldehyde. In preferred embodiments, no formaldehyde compounds are used, although trace amounts may be present due, for instance, to environmental contamination.

Although the balance of scientific evidence available to date indicates that the small trace amounts of these compounds that might be released from existing coatings does not pose any health risks to humans, these compounds are nevertheless perceived by some people as being potentially undesired. Consequently, there is a desire by some to eliminate at least some of these compounds from coatings on food-contact surfaces. Also, it is desirable to avoid the use of components that are unsuitable for such surfaces due to factors such as taste, toxicity, or other government regulatory requirements.

Optional Ingredients: The aqueous coating composition herein may also include other optional polymers that do not adversely affect the coating composition or a cured coating composition resulting therefrom. Such optional polymers are typically included in a coating composition as a filler material, although they can be included as a crosslinking material, or to provide desirable properties. One or more optional polymers (e.g., filler polymers) can be included in a sufficient amount to serve an intended purpose, but not in such an amount to adversely affect a coating composition or a cured coating composition resulting therefrom.

Such optional ingredients are typically included in the coating composition to enhance composition aesthetics, to facilitate manufacturing, processing, handling, and application of the composition, and/or to further improve a particular functional property of a coating composition or a cured coating composition resulting therefrom. In one approach, the optional ingredients include, for example, dyes, pigments, toners, extenders, fillers, lubricants, anticorrosion agents, flow control agents, thixotropic agents, dispersing agents, antioxidants, adhesion promoters, light stabilizers, surfactants, or mixtures thereof. Each optional ingredient is included in a sufficient amount to serve its intended purpose, but not in such an amount to adversely affect a coating composition or a cured coating composition resulting therefrom.

The coating composition may include an antioxidant. If included, the antioxidant may be from 0.001 weight percent to 0.1 weight percent of the coating composition based on the total weight of the coating composition. The antioxidant can help to protect the aqueous dispersion, e.g., at high cure temperatures. In some approaches, the antioxidant may include a hindered phenolic, such as, but is not limited to, pentaerythritol tetrakis(3-(3,5-di-tert-butyl-4-hydroxyphenyl)propionate, which is commercially available as IRGANOX™ 1010, available from Ciba.

Another useful optional ingredient may be a lubricant (e.g., a wax), which facilitates manufacture of metal closures by imparting lubricity to sheets of coated metal substrate. Examples of lubricants include, for example, carnauba wax, polyethylene type wax, Fischer-Tropsch wax, fatty acid ester wax, silicon-based wax, lanolin wax, hydroxy functional polysiloxane wax (such as, e.g., described in U.S. Pat. No. 9,169,406), and combinations thereof. If used, one or more lubricants can be present in the coating composition in an amount of at least 0.1 wt-%, and in certain embodiments no greater than 2 wt-%, and in other embodiments no greater than 1 wt-%, based on the weight of nonvolatile material. In other approaches, the lubricant may be provided in amounts ranging from at least about 0.1 wt-%, at least about 0.5 wt-%, or at least about 0.75 wt-% to less than 2 wt-%, less than 1.5 wt-%, less than 1.25 wt-%, or less than 1 wt-%.

Another useful optional ingredient is a pigment, such as titanium dioxide. If used, one or more pigments can be present in the coating composition in an amount of no greater than 70 wt-%, and in certain embodiments no greater than 50 wt-%, and in others no greater than 40 wt-%, based on the total weight of solids in the coating composition.

Surfactants can be optionally added to the coating composition to aid in flow and wetting of the substrate. Examples of surfactants, include, but are not limited to, nonylphenol polyethers and salts and similar surfactants known to persons skilled in the art. If used, one or more surfactants can be present in an amount of at least 0.01 wt-%, in certain embodiments at least 0.1 wt-%, based on the weight of resin solids. If used, one or more surfactants can be present in an amount no greater than 10 wt-%, and in certain embodiments no greater than 5 wt-%, based on the weight of resin solids.

In certain embodiments, as a general guide to minimize potential, e.g., taste and toxicity concerns, a hardened coating formed from the aqueous coating composition includes, if it includes any detectable amount, less than 50 ppm, less than 25 ppm, less than 10 ppm, or less than 1 ppm, extractables, if any, when tested pursuant to the Global Extraction Test described in the Examples Section. An example of these testing conditions is exposure of the hardened coating to 10 wt-% ethanol solution for two hours at 121° C., followed by exposure for 10 days in the solution at 40° C.

In some embodiments, such reduced global extraction values may be obtained by limiting the amount of mobile or potentially mobile species in the hardened coating. This can be accomplished, for example, by using pure, rather than impure reactants, avoiding the use of hydrolyzable components or bonds, avoiding or limiting the use of low molecular weight additives that may not efficiently react into the coating, and using optimized cure conditions optionally in combination with one or more cure additives. This makes the hardened coatings formed from the coating compositions described herein particularly desirable for use on food-contact surfaces.

As described above, the coating compositions herein are particularly well adapted for use on beverage containers or cans, or portions or precursors thereof, subjected to the short cure cycles. Two-piece cans are manufactured by joining a can body (typically a drawn metal body) with a can end (typically an easy open can end formed from aluminum or steel or sheet). The coatings of the present invention are suitable for use in beverage contact situations and may be used on the inside of such cans. They are particularly suitable for roll coating applications or liquid coatings for easy open beverage can ends. The coatings herein also offer utility in other applications. These additional applications include, but are not limited to, wash coating, sheet coating, and side seam coatings (e.g., food can side seam coatings).

A coating process is the coating of a continuous composed of a metal such as steel or aluminum. Once coated, the coating is subjected to a short thermal, ultraviolet, and/or electromagnetic curing cycle, for hardening (e.g., drying and curing) of the coating. Coatings provide coated metal (e.g., steel and/or aluminum) substrates that can be fabricated into formed articles, such as two-piece drawn food cans, three-piece food cans, food can ends, drawn and ironed cans, beverage can ends, and the like. The metal substrates for typical coating process often have an average thickness of about 175 to about 230 micrometers. Often, a surface of the metal substrate is pretreated with a chromium-based or non-chromium-based (e.g., zirconium and acrylic-based pretreatment) pretreatment prior to coating with the coating composition In one example of a coating process, the coating may occur by first providing a substrate, such as aluminum or steel, for forming a food or beverage can end. Next, the aqueous coating compositions as described herein may be applied to a surface of the substrate (e.g., by roll application or any other suitable technique). Then, the applied aqueous coating composition is cured for a time and at a peak metal temperature to form a cured coating on the surface of the substrate. Finally, the coated aluminum or steel substrate is then formed or stamped into an appropriate food or beverage can or can end.

In some approaches, the aqueous coating composition may be applied using a conventional roller coating process either continuously on lines or batch-wise on substrate sheets. In some embodiments, the moving surface of a substrate in a continuous process is traveling at a line speed of at least about 50 meters per minute, at least about 100 meters per minute, at least about 200 meters per minute, or at least about 300 meters per minute. Typically, the line speed will be less than about 400 meters per minute. For such continuously moving surfaces, the aqueous coating composition is typically applied at coating weights and relative thicknesses to achieve a desired average coating thickness upon curing. In certain embodiments, the resulting average dry film thickens on the substrate may be at least about 7 micrometers, at least about 8 micrometer, or at least about 9 micrometers, and may be up to about 11 micrometers, up to about 12 micrometers, or up to about 15 micrometers. Once applied onto the substrate, any suitable cure mechanism may be employed. For example, the coating composition can be subjected to thermal convection, ultraviolet radiation, electromagnetic magnetic radiation or combinations thereof in a curing cycle that provides sufficient drying and curing of the coating composition to form a desired final coating.

In some approaches, the curing time of the coating compositions of this disclosure is at least about 6 seconds, at least about 10 seconds or at least about 12 seconds, and up to about 15 seconds, up to about 20 seconds, up to about 25 seconds or up to about 30 seconds. Preferably, the curing time is 8 to 15 second, 8 to 12 seconds, or 10 to 12 seconds. In the context of thermal bakes to cure the coating, such curing times refer to the residence time in the oven(s). In such embodiments, the curing process is typically conducted to achieve peak metal temperatures (PMT) of about 200° C. to about 260° C. and, in other approaches, about 230 to about 255° C.

Sheet coating may also be used for the compositions herein. Sheet coating is the coating of separate pieces of a variety of materials (e.g., steel or aluminum) that have been pre-cut into square or rectangular "sheets." Typical dimensions of these sheets are approximately one square meter. Once coated, each sheet is cured. Once hardened (e.g., dried and cured), the sheets of the coated substrate are collected and prepared for subsequent fabrication. Sheet coatings provide coated metal (e.g., steel or aluminum) substrate that can be successfully fabricated into formed articles, such as two-piece drawn food cans, three-piece food cans, food can ends, drawn and ironed cans, beverage can ends, and the like.

In any of the above application methods, the coating compositions herein can be applied to a substrate using any suitable procedure including, for example, spray coating, roll coating, coating, curtain coating, immersion coating, meniscus coating, kiss coating, blade coating, knife coating, dip coating, slot coating, slide coating, vacuum coating, and the like, as well as other types of pre-metered coating. Other commercial coating applications and curing methods are also envisioned, including, for example, electro-coating, extrusion coating, laminating, powder coating, (e.g., after spray drying to form powder) and the like.

Depending on the particular application and article, the coating compositions herein can be applied on a substrate prior to, or after, forming the substrate into an article. In some embodiments, at least a portion of a planar metal substrate (e.g., metal coil) is coated with a layer of the coating composition of the present invention, which is then cured before the planar substrate is formed (e.g., stamped) into an article (e.g., an easy open can end).

After applying the coating composition onto a substrate, the composition can be cured using a variety of processes, including, for example, oven baking conventional methods, or any other method that provides an elevated temperature suitable for curing the coating. The curing process may be performed in either discrete or combined steps. For example, substrates can be dried at ambient temperature to leave the coating compositions in a largely un-crosslinked state. The coated substrates can then be heated to fully cure the compositions. In certain instances, coating compositions of the present invention can be dried and cured in one step.

Embodiments of the liquid polymeric coating composition directed to a beverage can end should preferably exhibit sufficient flexibility in the cured coating composition to accommodate the extreme contour of the rivet portion of the easy open can end. In some approaches, tests conducted to determine if a particular coating can function as an easy open can end may be the Porosity Test and Feathering test, set forth herein. The Porosity Test indicates the level of flexibility of a coating and measures the ability of the coating to retain its integrity and substrate adhesion as it undergoes the formation process necessary to produce a beverage can end. In particular, it is a measure of the presence or absence of cracks or fractures in the interior coating of the formed end. Feathering refers to the adhesion loss of a coating adjacent to the drinking spout of a beverage can or container end and, when present, indicates that a portion of free film may remain across the opening of a container or can when opened.

Exemplary coatings of the present invention display one or more of the properties described in the Examples Section. In some approaches, the coatings of the present disclosure display one or more of the following properties (and in some embodiments all properties or various combinations of such properties): metal exposure value (preferably after the can end is formed and stamped) of less than 5 milliamps (mA) or less than 3 milliamps (mA) (more preferably, less than 2 mA, and even more preferably less than 1 mA); global extraction results of no greater than 50 ppm (more preferably no greater than 25 ppm, and even more preferably no greater than 10 ppm, and even more preferably, no greater than 1 ppm extractables); adhesion rating of GT0 after water pasteurization; no blush after water pasteurization although (on a rating scale of 0 to 10) at least 7, at least 8, or at least 9 may be acceptable for certain situations; MEK solvent resistance of at least 30 double rubs; feathering, if any, about 0.5 mm or less, in other approaches, about 0.4 mm or less, about 0.3 mm or less, about 0.2 mm or less, or about 0.1 mm or less, or none.

In some approaches, the aqueous coating compositions herein, when applied to a cleaned and chrome-free pretreated aluminum panel and cured for 12 seconds oven cure time to a peak metal temperature of about 249° C. to achieve a dried film thickness of approximately 12 grams per square meter and formed into a fully converted 202 standard opening beverage can end, passes less than 5 milliamps of current while being exposed for 4 seconds to an electrolyte solution containing 1% by weight of NaCl dissolved in deionized water.

In yet further approaches, the aqueous coating compositions herein, when applied to a cleaned and chrome-free pretreated aluminum panel and cured for 12 seconds of oven cure time to a peak metal temperature of 249° C. to achieve a dried film thickness of approximately 7.5 milligram per square inch, exhibits 0.5 mm or less of feathering, about 0.4 mm or less of feathering, about 0.3 mm or less of feathering, or about 0.2 mm or less of feathers. In preferred embodiments, the aqueous coating compositions herein are able to achieve such superior feathering properties when cured for no more than 12 seconds.

In yet further approaches, the aqueous coating compositions herein have a viscosity measured using an Number 4 Ford cup via ASTM D-1200 between 35 and 60 seconds when measured at 25° C.

The present disclosure also provides methods that include causing the aqueous coating composition to be used on a metal substrate of metal packaging (e.g., metal coil or sheet for use in forming beverage can ends). In some cases where multiple parties are involved, a first party (e.g., the party that manufactures and/or supplies the aqueous coating composition) may provide instructions, recommendations, or other disclosures about the packaging coating end use to a second party (e.g., a metal coater (e.g., a coil coater for easy open food or beverage can ends), can maker, or brand owner). Such disclosures may include, for example, instructions, recommendations, or other disclosures relating to coating a metal substrate for subsequent use in forming packaging containers or portions thereof, coating a metal substrate of pre-formed containers or portions thereof, preparing aqueous coating compositions for such uses, cure conditions or process-related conditions for such coatings, or suitable types of packaged products for use with resulting coatings. Such disclosures may occur, for example, in technical data sheets (TDSs), safety data sheets (SDSs), regulatory disclosures, warranties or warranty limitation statements, marketing literature or presentations, or on company websites. A first party making such disclosures to a second party shall be deemed to have caused the aqueous coating compositions to be used on a metal substrate of metal packaging (e.g., a container or easy open end) even if it is the second party that actually applies the composition to a metal substrate in commerce, uses such coated substrate in commerce on a metal substrate of packaging containers, and/or fills such coated containers with product.

EXAMPLES

The following examples are given to illustrate, but not limit, the scope of this invention. Unless otherwise indicated in the Examples and throughout this disclosure, all parts, ratios, and percentages are by weight and all molecular weights are weight average molecular weight. Unless otherwise specified, all chemicals used are commercially available from, for example, Sigma-Aldrich (St. Louis, MO). One or more of the following test methods are used within the following Examples Solvent Resistance: The extent of "cure" or crosslinking of a coating is measured as a resistance to solvents, such as methyl ethyl ketone (MEK). This test is performed as described in ASTM D 5402-93. The number of double-rubs (i.e., one back-and-forth motion) is reported. Preferably, the MEK solvent resistance is at least 30 double rubs, preferably at least 50 double rubs, and more preferably, at least 100 double rubs, although can coatings that exhibit very low double rubs in this test and be commercially viable in some instances.

Blush Resistance: Blush resistance measures the ability of a coating to resist attack by various solutions after pasteurization or retort. Typically, blush is measured by the amount of water absorbed into a coated film. When the film absorbs water, it generally becomes cloudy or looks white. Blush is generally measured visually using a scale of 0 to 10 where a rating of "10" indicates no blush and a rating of "0" indicates complete whitening of the film. Blush ratings after pasteurization or retort (as described herein) of at least 6 are preferred and 7 or above are more preferred, and 9 or above are most preferred.

Retort: Testing is accomplished by subjecting the coating substrate to heat ranging from 105 to 130° C. and pressure ranging from 0.7 kg/cm$^2$ to 1.05 kg/cm$^2$ for a period of 15 minutes to 90 minutes. For the evaluations herein, a coated substrate was immersed in deionized water and subjected to heat of 121° C. (250° F.) and pressure of 1.05 kg/cm$^2$ for a period of 30 minutes.

Pasteurization: Testing is performed by immersing a coated substrate in a heated water bath for 5 minutes to 60 minutes at temperatures ranging from 65° C. to 100° C. For the present evaluations, a coated substrate was immersed in a deionized water bath for 30 minutes at 85° C.

Feathering: As shown in FIGS. 1 to 4, feathering is measured using a 0.226 mm gauge coated aluminum reference sheet 10, a score tool having a 60 micron score width set up in a Carver press (or equivalent), a 7× magnifier graduated in increments of 0.005 inches (or equivalent), an optional 6 inch vice, a 2000 mL beaker (or equivalent), and a thermometer. The sample to be tested is prepared by cutting a 2 inch by 6 inch sheet 10 from the area to be tested. The 2 inch cut must be in the rolling direction (with the grain of the metal). Using a permanent marker, a straight line may be made along the entire 6 inch edge of the product side for reference in forming simulated tabs. Using the permanent marker, a ¼ inch straight-line mark is made about ½ inch in from the top edge of the test sample on the product side, then five additional ¼ inch straight-line marks are made about 1 inch apart along the 6 inch width of the sample to help space out the simulated tabs.

Figure 1:
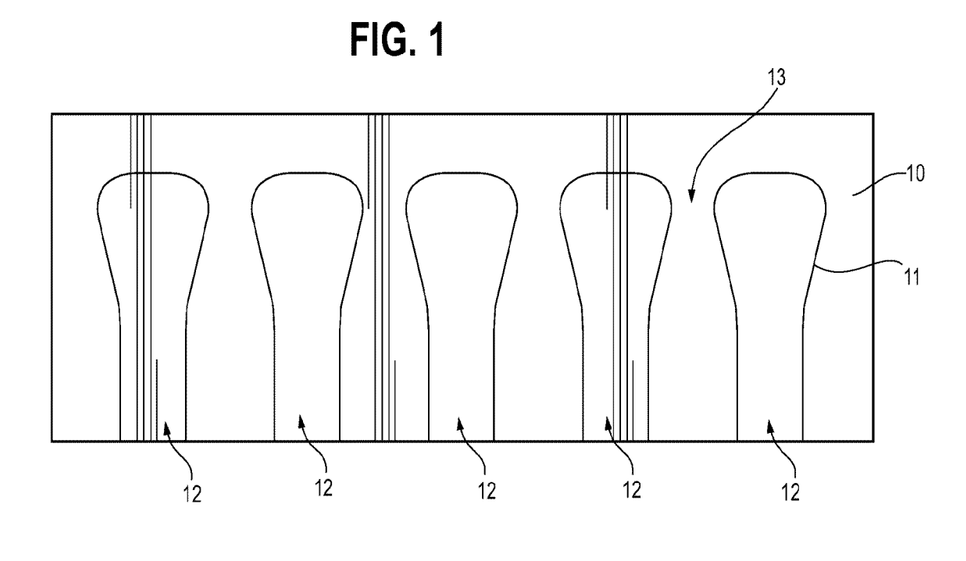
FIGS. 1 to 4 are exemplary plan and perspective views of a metal sheet having simulated tabs formed thereon for feathering evaluation as described in the Examples.
Figure 2:
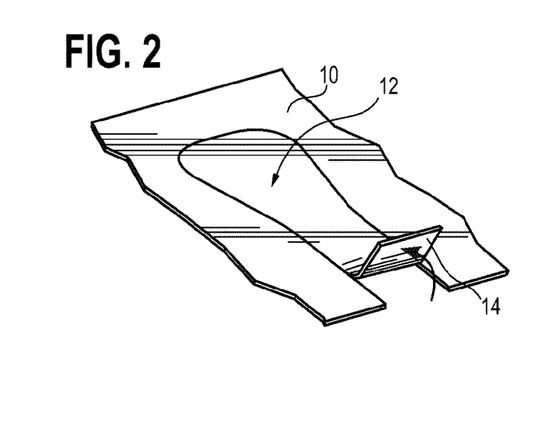

For testing, the sheet 10 (coated or product side up) is placed between the score tool and the anvil in the Carver press. The first ¼ inch line on the sample is matched up with the black line on the score tool. The bottom edge of the sample should be aligned flush against a guide block on the inside of the press. Manually jack the press lever until a force of 5 metric tons registers on the hydraulic pressure gauge to form a score line 11 producing a simulated tab 12. The sheet 10 is then indexed to the second black line at the top edge of the sample. Again, jack the press lever until a force of 5 metric tons registers on the hydraulic pressure gauge to form another score line 11 producing a second simulated tab 12. Repeat to make a total of five simulated tabs 12 along the 6 inch width as generally shown in FIG. 1. Next, either manually or by using a pair of small shears, cut or tear a portion 14 of the simulated tabs 12 for approximately ¼ inch as generally shown in FIG. 2. The tab portion 14 may be bent upward 90 degrees.

Figure 3:
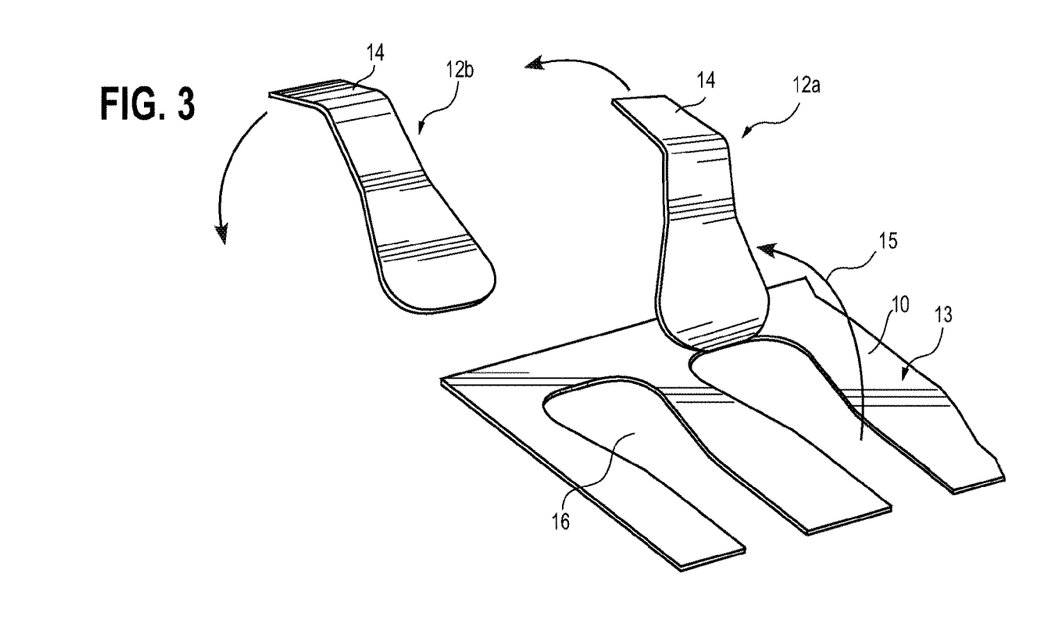
Figure 4:
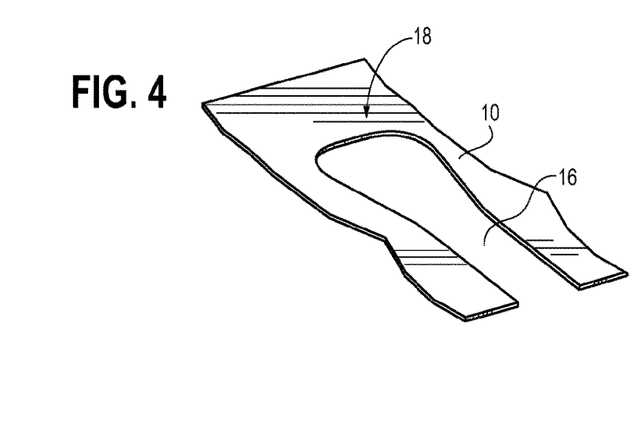

Next, the sheet 10 is conditioned, such as by submerging the test sample upright (that is the "legs" facing up) into a water bath as needed for the selected suitable testing such the beaker and thermometer as needed. Typically, conditioning is about 45 minutes at 85° C. in DI water followed by a cool down with tap water before further testing. Other processing conditions may be used as needed for a particular application. For the evaluation of feathering, one sheet 10 at a time is evaluated by drying each one before testing. First, the sheet 10 is turned so that the coating side 13 is facing the operator. The scored legs 14 of each simulated tab is upward at a 90° angle back toward the operator. The sheet 10 is then placed on a flat surface (adhesive tape or other fastening method (i.e. vice) may be used if necessary to fix a panel edge on the surface). A pair of pliers or other device (not shown) is then used to pull 15 each simulated tab 12 straight back towards the operator (parallel to the floor) to completely remove the tab from the test sample. FIG. 3 shows simulated tab 12a in the process of being pulled and simulated tab 12b removed from the sheet 10. After pulling all five simulated tabs, feathering is measured on the end 18 of the formed opening 16 of the sample 10 using, for instance, the 7× ocular marked in increments of 0.005 inches as generally shown in FIG. 4. Feathering is determined by calculating the average of all five values on each sheet 10.

Coatings for easy-open beverage can ends preferably show feathering below 0.5 mm, more preferably below 0.4 mm, most preferably below 0.3 mm, and optimally 0.2 mm or even less feathering. Certain preferred films of the this disclosure, when suitably cured, exhibited a feathering of 0.1 mm or less when tested as described above and when subjected to the short cure cycles noted herein.

Coefficient of Friction (COF): Coefficient of friction is measured with an Alteck (or comparable Mobility or Lubricity Tester) using a metal ball moving on the surface of the coating with a pressure of about 2 kg weight. The force required to move the metal ball on the coating is measured and its coefficient of friction is calculated with this force. Coatings of the present disclosure typically having coefficient of friction of 0.06 or below and preferably between about 0.04 and 0.06.

Porosity: The Porosity Test is conducted by placing a coated beverage can end on a cup filled with an electrolyte solution. The cup is inverted to expose the interior coated surface of the can end to the electrolyte solution. The amount of electrical current that passes through the end is then measured. If the coating remains intact (no cracks or fractures) after fabrication, minimal current will pass through the end. For the present evaluation, fully converted 202 standard opening can ends (which are "riveted" aluminum beverage can ends) are exposed for a period of 4 seconds to an electrolyte solution containing 1% NaCl by weight in deionized water. Metal exposures are measured using a WACO Enamel Rater II, available from the Wilkens-Anderson Company, Chicago, IL, with an output voltage of 6.3 volts. The measured electrical current is reported in milliamps. End continuities are typically tested initially and then after the ends are subjected to either pasteurization or retort. A coating is considered to satisfy the Porosity Test if it passes an electric current (after end formation) of less than about 10 milliamps (mA) when tested as described above. Preferred coatings pass the initial test with less than 5 milliamps (mA), more preferably less than 2 mA, and even more preferably less than 1 mA. Preferred coatings pass the porosity test after pasteurization with less than 10 mA, more preferably less than 8 mA, and even more preferably less than 5 mA.

Global Extraction Test: The global extraction test is designed to estimate the total amount of mobile material that can potentially migrate out of a coating and into food packed in a coated can. Typically, a coated substrate is subjected to water or solvent blends under a variety of conditions to simulate a given end-use. Acceptable extraction conditions and media can be found in 21 CFR § 175.300, paragraphs (d) and (e), which is incorporated herein by reference. If evaluated herein, the extraction procedure was conducted in accordance with the Food and Drug Administration (FDA) "Preparation of Premarket Submission for Food Contact Substances: Chemistry Recommendations," (December 2007). The allowable global extraction limit as defined by the FDA regulation is 50 parts per million (ppm).

The single-sided extraction cells are made according to the design found in the Journal of the Association of Official Analytical Chemists, 47(2):387(1964), with minor modifications. The cell is 9 inch×9×0.5 inch with a 6 inch×6 inch open area in the center of the TEFLON spacer. This allows for 36 in$^2$ or 72 in$^2$ of test article to be exposed to the food simulating solvent. The cell holds 300 mL of food simulating solvent. The ratio of solvent to surface area is then 8.33 mL/in$^2$ and 4.16 mL/in$^2$ when 36 in$^2$ and 72 in$^2$ respectively of test article are exposed.

The test articles may consist of 0.0082 inch thick 5182 aluminum alloy panels, pretreated with Permatreat® 1903 (supplied by Chemetall GmbH, Frankfurt am Main, Germany). These panels are coated with the test coating (completely covering at least the 6 inch by 6 inch area required to fit the test cell) to yield a final, dry film thickness of 11 grams per square meter (gsm) following a 10 second curative bake resulting in a 242° C. peak metal temperature (PMT). Two test articles are used per cell for a total surface area of 72 in² per cell. The test articles are extracted in quadruplicate using 10% aqueous ethanol as the food-simulating solvent. The test articles are processed at 121° C. for two hours, and then stored at 40° C. for 238 hours. The test solutions are sampled after 2, 24, 96 and 240 hours. The test article is extracted in quadruplicate using the 10% aqueous ethanol under the conditions listed above.

Each test solution was evaporated to dryness in a pre-weighed 50 mL beaker by heating on a hot plate. Each beaker was dried in a 250° F. (121° C.) oven for a minimum of 30 minutes. The beakers are then placed into a desiccator to cool and then weighed to a constant weight. Constant weight is defined as three successive weighings that differ by no more than 0.00005 g. Solvent blanks using Teflon sheet in extraction cells are similarly exposed to simulant and evaporated to constant weight to correct the test article extractive residue weights for extractive residue added by the solvent itself. Two solvent blanks are extracted at each time point and the average weight is used for correction.

Total nonvolatile extractives are calculated as follows: Ex=e/s and wherein the variable "Ex" refers to the extractive residues (mg/in²); "e" refers to extractives per replicate tested (mg); and "s" refers to the area extracted (in²). Preferred coatings give global extraction results at all of the above-tested time periods of less than 50 ppm, more preferred results of less than 10 ppm, even more preferred results of less than 1 ppm. Most preferably, the global extraction results are optimally non-detectable.

Example 1

Polyolefin dispersions were prepared according to the compositions of Table 1 below providing the weight percent of each component in the evaluated composition. For this evaluation, the polyolefin was the Canvera 1350 product (46% solids) commercially available from Dow Chemical, the catalyst was the Tyzor TE product from DuPont, and the cross linker was Primid QM 1260 available from EMS-Chemie AG. Additionally, the samples included 2-dimethyl amino ethanol (DMEA) (16.5 weight percent in water), and the lubricant was a carnauba T3 type. The DMEA was either blended with the cross linker and/or with the catalyst.

Generally, the cross linker, if used, was first dissolved in DI water with 0.3 weight percent of the DMEA solution using moderate stirring for about 30 minutes to obtain a colorless aqueous resin solution to form a 30 weight percent solution of the cross linker in water with the DMEA. Then, the monoethylene glycol was added followed by the polyolefin dispersion and any remaining DMEA solution under vortex agitation to minimize solvent shock. Finally, the wax dispersion was added in a post addition using moderate stirring and the solids content and viscosity of the formula were adjusted with water.

TABLE 1

| Component | Comparative Sample A WT-% | Comparative Sample B WT-% | Comparative Sample C WT-% | Inventive Sample D WT-% |
|---|---|---|---|---|
| Polyolefin | 73.97 | 70.25 | 73.58 | 69.9 |
| Added DI water | 17.46 | 16.58 | 17.38 | 16.5 |
| Catalyst | None | none | 0.52 | 0.5 |
| Cross Linker | None | 4.94 | none | 4.91 |

TABLE 1-continued

| Component | Comparative Sample A WT-% | Comparative Sample B WT-% | Comparative Sample C WT-% | Inventive Sample D WT-% |
|---|---|---|---|---|
| DMEA solution | 0.32 | 0.39 | 0.31 | 0.39 |
| MEG | 5.29 | 5.03 | 5.26 | 5 |
| Wax dispersion | 2.96 | 2.81 | 2.95 | 2.8 |
|  | 100 | 100 | 100 | 100 |
| Final Solids | 32.0% | 32.4% | 32.8% | 32.0% |
| Ph | 8.0 | 8.3 | 8.0 | 8.3 |
| Viscosity ISO 4 Cup (25° C.) | 43 seconds | 40 seconds | 43 seconds | 40 seconds |

Each composition of Comparative Samples A to C and Inventive Sample D were separately applied to an aluminum substrate (0.0082-inch-thick 5182 aluminum alloy with chromium-free pretreatment (Permatreat® 1903 supplied by Chemetall GmbH, Frankfurt am Main, Germany)) formed into a 202 beverage can end. A sufficient amount of the sample was applied using a bardown hand coater application method to achieve a 12 grams per square meter dry coating weight. The coated panels were cured in a lab-sized oven including 5 zones to achieve a peak metal temperature of 249° C. after a 12 second oven residence time. Cured panels were pressed into an easy open scored beverage can end with a rivet. Test results for feathering, cure, porosity, pasteurization, and retort as described above are provided in Table 2.

TABLE 2

| Parameter | Comparative Sample A | Comparative Sample B | Comparative Sample C | Inventive Sample D |
|---|---|---|---|---|
| Feathering (after retort) | 1.5 mm | 3.5 mm | 0.8 mm | 0.3 mm |
| MEK Double Rub | 100 | 100 | 100 | 100 |
| Porosity (after pasteurization) | 4.1 mA | 1.92 mA | 1.74 mA | 1.1 mA |
| Pasteurization (Tap water blush) | 6 | 6 | 5.5 | 6 |
| DI Water Retort | 5 | 6 | 5 | 6 |

Comparative Sample A and Inventive Sample D were retested after of a month of aging at 40° C. After aging, samples A and D were recoated with the aged compositions and cured with the same initial baking conditions described above. Sample D again out-performed Sample A in the context of feathering, porosity, pasteurization, and retort as shown in Table 4 below.

TABLE 4

| Parameter | Comparative Sample A | Inventive Sample D |
|---|---|---|
| Feathering (after retort) | 3 mm | 0.5 mm |
| MEK Double Rub | 100 | 100 |
| Porosity (after pasteurization) | 4.1 | 2 |
| Pasteurization (Tap water blush) | 6 | 6 |
| DI Water Retort | 5 | 6 |

It is noted that, as used in this specification and the appended claims, the singular forms "a," "an," and "the,"

include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein. Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents. The complete disclosure of all patents, patent documents, and publications are incorporated herein by reference as if individually incorporated.

What is claimed is:

1. An aqueous coating composition comprising:
a carrier fluid;
at least about 50% by weight percent of one or more polyolefin polymers, based on the total resin solids of the coating composition;
a nitrogen-containing carboxyl reactive cross linker; and
a water-dispersible transition metal catalyst;
wherein the aqueous coating composition is an easy open beverage can end coating composition, and wherein the aqueous coating composition, when applied to a cleaned and chrome-free pretreated aluminum panel and cured for 12 seconds to a peak metal temperature of 249° C. to achieve a dried film thickness of approximately 12 grams per square meter, exhibits, if any, 0.5 mm or less of feathering.

2. The aqueous coating composition of claim 1, wherein the coating composition is an interior easy open beverage can end coating composition that, when applied to a cleaned and chrome-free pretreated aluminum panel and cured for 12 seconds to a peak metal temperature of 249° C. to achieve a dried film thickness of approximately 12 grams per square meter and formed into a fully converted 202 standard opening beverage can end, passes less than 5 milliamps of current while being exposed for 4 seconds to an electrolyte solution containing 1% by weight of NaCl dissolved in deionized water.

3. The aqueous coating composition of claim 2, wherein the nitrogen-containing carboxyl-reactive cross linker includes at least one amide group, at least one imide group, or a combination thereof.

4. The aqueous coating composition of claim 1, wherein the nitrogen-containing carboxyl-reactive cross linker includes a beta-hydroxyl group relative to a nitrogen atom of an amide bond.

5. The aqueous coating composition of claim 1, wherein the nitrogen-containing carboxyl-reactive cross linker comprises:

6. The aqueous coating composition of claim 1, wherein the coating composition includes at least about 5 weight percent of one or more organic solvents.

7. The aqueous coating composition of claim 6, wherein the coating composition includes a lubricant.

8. The aqueous coating composition of claim 7, wherein the lubricant is selected from Carnauba wax, polyethylene-based wax, Fischer-tropsch wax, fatty acid ester wax, silicon-based wax, lanolin wax, hydroxyl-functional poly siloxane wax or combinations thereof.

9. The aqueous coating composition of claim 1, wherein the one or more polyolefin polymers include an acid-functionalized polyolefin, wherein the acid functionalized polyolefin is a copolymer with structural units derived from reactants including one or more C2 to C10 alpha-olefins and (meth) acrylic acid.

10. The aqueous coating composition of claim 9, includes a polyolefin copolymer with structural units derived from reactants including ethylene and one or more $C_3$ to $C_{10}$ alpha-olefins.

11. The aqueous coating composition of claim 2, wherein:
the nitrogen-containing carboxyl-reactive cross linker includes a beta-hydroxyl group relative to a nitrogen atom of an amide bond; and
the coating composition includes at least about 5 weight percent of one or more organic solvents.

12. The aqueous coating composition of claim 11, wherein the one or more polyolefin polymers include structural units derived from reactants including two or more C2 to C10 alpha-olefins.

13. The aqueous coating composition of claim 12, wherein the coating composition includes a lubricant.

14. The aqueous coating composition of claim 13, wherein the nitrogen-containing carboxyl-reactive cross linker comprises:

15. The aqueous coating composition of claim 11, wherein the one or more polyolefin polymers includes (i) a polyolefin copolymer having structural units derived from reactants including two or more C2 to C4 alpha-olefins and (ii) an acid functional polyolefin copolymer.

16. The aqueous coating composition of claim 2, wherein the coating composition includes at least about 150 ppm of the transition metal catalyst based on the total amount of transition metal in the catalyst relative to the total non-volatile weight of the aqueous coating composition, and wherein the transition metal catalyst includes at least one metal selected from aluminum (Al), cobalt (Co), iron (Fe), titanium (Ti), zinc (Zn), zirconium (Zr), or mixtures thereof.

17. The aqueous coating composition of claim 2, wherein the transition metal catalyst is selected from titanium acetylacetonate, tetraalkyltitanates, isopropylorthotitanate, water-soluble titanium chelated salts, triethanolamine chelates of titanium, tetratriethanolamine chelates of titanium, lactic acid titanate chelate salts, or a combination thereof.

18. The aqueous coating composition of claim 12, wherein the transition metal catalyst comprises an organometallic transition metal catalyst.

19. An article comprising an easy open beverage can end with a coating disposed on at least a portion of can end and wherein the coating is formed from the aqueous coating composition of claim 1.

20. A method comprising causing the aqueous coating composition of claim 1 to be applied to a surface of an aluminum or steel substrate for forming an easy open end beverage can end.

* * * * *